July 1, 1969  E. J. GYORY  3,452,994
MECHANICAL FACE SEAL
Filed Aug. 1, 1966  Sheet 1 of 2
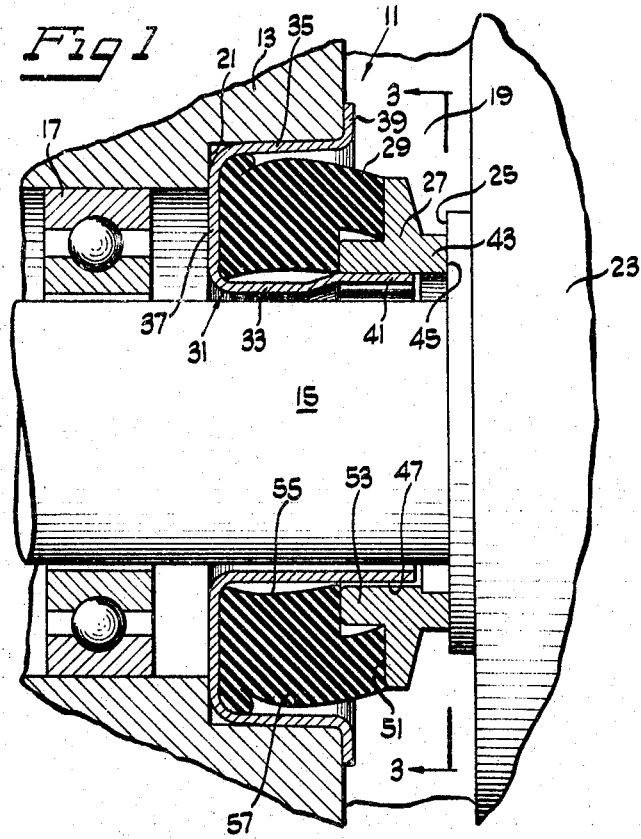
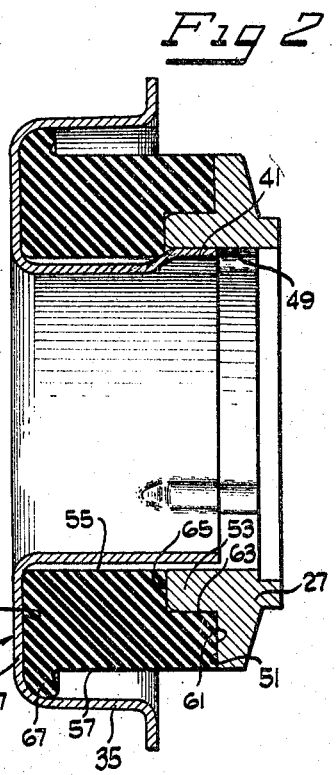
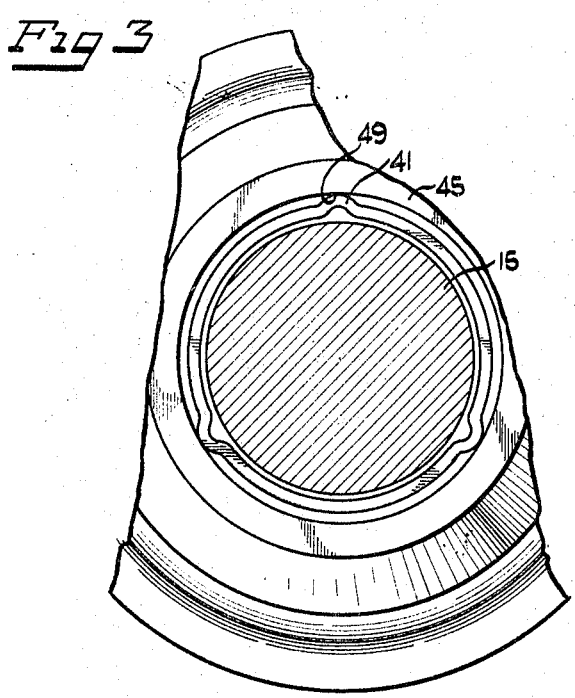
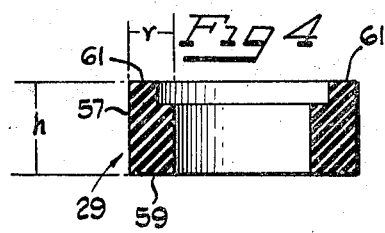
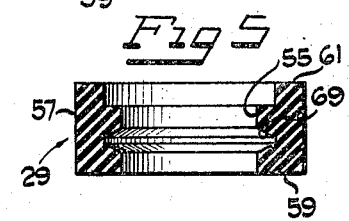
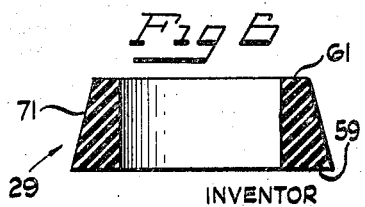
INVENTOR
EMERIC GYORY
BY
ATTORNEY

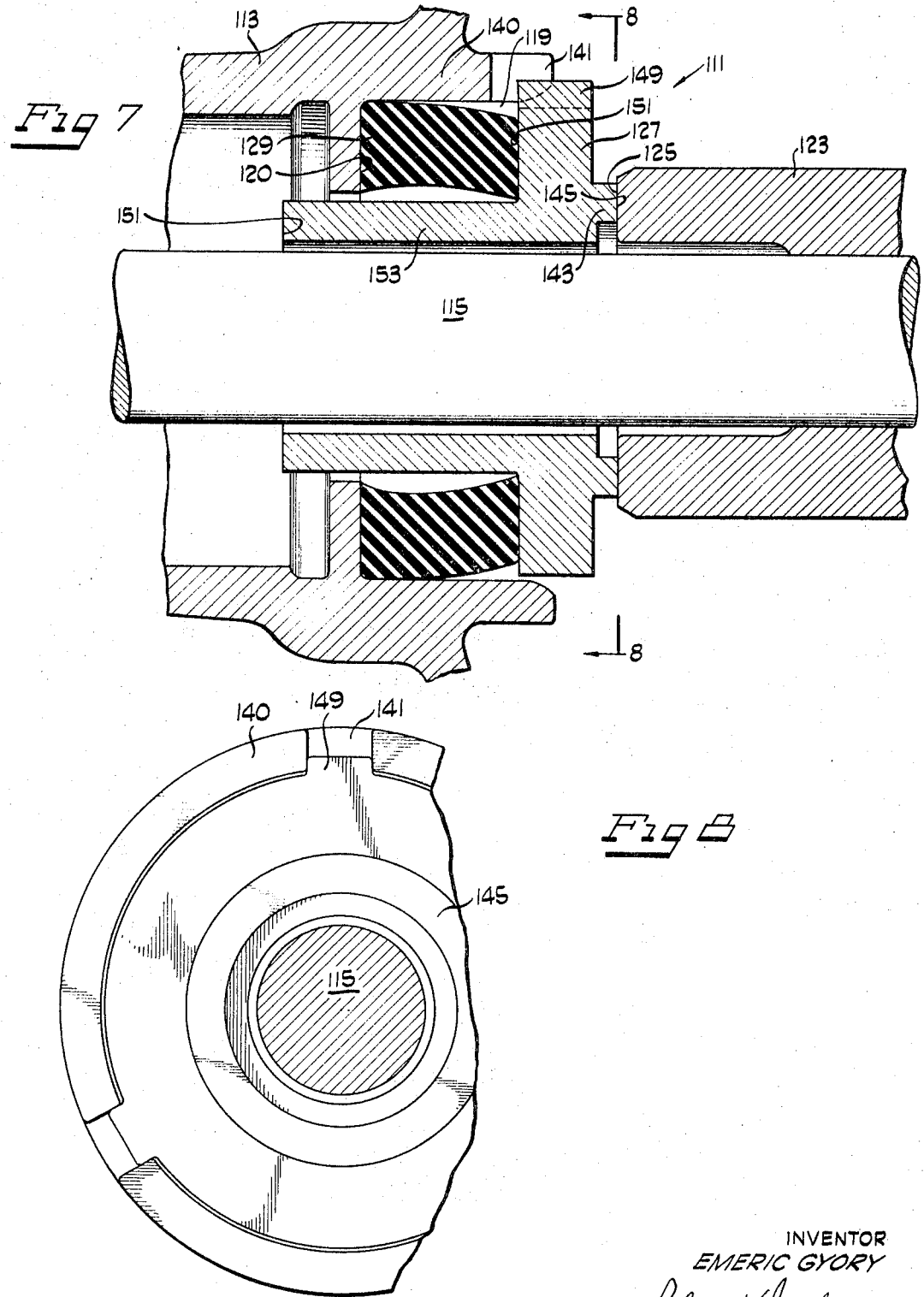

United States Patent Office 3,452,994
Patented July 1, 1969

3,452,994
MECHANICAL FACE SEAL
Emeric J. Gyory, Chicago, Ill., assignor to Borg-Warner Corporation, Chicago, Ill., a corporation of Illinois
Filed Aug. 1, 1966, Ser. No. 569,279
Int. Cl. F16j 15/38
U.S. Cl. 277—42                                                                 14 Claims

ABSTRACT OF THE DISCLOSURE

A mechanical face seal for sealing a rotating shaft in a housing to provide an essentially fluid tight seal against a pressurized fluid including a rigid annular sealing ring urged into sealing engagement with a relatively rotating coacting sealing face to provide a dynamic seal and including a liquid impervious member formed of a resilient non-cellular silicone material disposed between the housing and the rigid annular sealing ring to provide the spring force to urge the relatively rotating sealing faces into engagement and to provide a static seal between the housing and the ring.

---

This invention relates to mechanical seals. More particularly it relates to mechanical seals of the "face" type.

Mechanical seals utilized to provide an effective seal between a rotating shaft and a housing surrounding the shaft may generally be categorized in two main types, namely, "lip" seals and "face" seals.

Lip seals usually include a resilient member which is in sliding contact with a relatively rotating rigid surface. This rigid surface may be either axially or radially directed, i.e., the outer surface of the shaft, a radially directed portion of a bearing inner face, or a surface formed on the shaft extending radially outwardly especially adapted for sealing contact with the resilient member.

While lip seals are effective in many applications they are generally unstable to withstand environments where the pressure differential between the interior and exterior of the housing is substantial. They have therefore traditionally been used as bearing grease retainers, dirt guards or the like.

In pump construction and other applications where the sealed fluid is maintained at an elevated pressure, "face" type seals have found wider usage. Face seals generally include a stationary sealing ring and a rotatable sealing ring each of which includes a running face in contact with the cooperating running face of the other ring. One of the two rings is axially movable and is biased axially to maintain the sealing faces in sliding contact.

The axial biasing force is necessary because of the fluid pressure acting upon the seal components. A separating force is created upon the relatively rotating rings by the fluid being sealed which penetrates between the sealing faces. Additionally, since the seal components are exposed to pressurized fluid, axial forces are created which, depending on the resultant direction may either increase or decrease the load upon the relatively rotatable contact faces. If the net area exposed to fluid pressure is disposed such that the fluid pressure acts in a direction tending to separate the seal faces, this force must also be overcome by the biasing means.

The biasing force is also effective to compensate for wear of the seal faces. The axially movable ring is maintained in sealing engagement with the opposing ring even though wear of the contacting surfaces reduces the axial length of the biased ring.

The biasing force required in the face type seal is generally provided by a compression type coil spring interposed between the housing and the stationary sealing ring or between the rotating sealing ring and a support secured to the shaft.

The presence of the conventional biasing spring and the need for axial movement of the sealing ring establishes a secondary path for leakage between the shaft and the housing, and, therefore, a secondary or static seal must also be provided. The static seal is usually formed of a liquid impervious resilient boot which extends between the biased ring and the support or housing, depending on whether the biased ring is associated with the shaft or the housing.

It has been found that though the boot arrangement provides the necessary static seal it introduces certain undesirable physical characteristics into the seal structure. The boot is relatively fragile and is subject to rupture causing premature seal failure. Further, the presence of the boot complicates assembly procedure both of the seal assembly and the apparatus into which the seal is ultimately installed.

Use of the boot also requires that additional components be included in the seal assembly. Ferrules or distribution rings are generally required to insure an efficient static seal.

Accordingly, it is the principal object of the present invention to provide an improved form of mechanical seal of the face type.

It is another object of the present invention to provide an improved form of face seal which eliminates the need for a resilient boot.

It is a further object of the present invention to provide an improved face seal which eliminates the need for a coil spring biasing means.

It is a still further object of the present invention to provide an improved form of face seal which includes a biasing means which provides an axial biasing force upon an axially movable sealing ring and additionally provides a static seal between that ring and a support or housing.

It is a further object of the present invention to provide an improved form of face seal which includes an elastomeric element which is impervious to liquid and is adapted to provide an axial biasing force upon the sealing ring.

It is a related object of the present invention to provide an improved form of face seal having an elastomeric element which is adapted to be placed in compression between a support or housing and a sealing ring to provide a static seal and to simultaneously provide an axial biasing force upon the sealing ring.

It is another object of the present invention to provide an improved form of mechanical seal of the face type which includes an elastomeric element formed of a silicone rubber.

It is another object of the present invention to provide an improved form of mechanical seal of the face type which includes an elastomeric element which retains its resilient properties over an extended period of time even while subjected to continuous compressive forces.

It is a still further object of the present invention to provide an improved form of mechanical seal of the face type which includes an elastomeric element which retains its resilient properties over an extended period of time even while subjected to continuous compressive forces wherein the resilient properties are retained for a period longer than the expected service life of the sealing face of the associated sealing ring.

These and other objects of the present invention will become apparent with reference to the following description and the accompanying drawings.

In the drawings:

FIGURE 1 is a partially broken away sectional view of an apparatus including a mechanical seal illustrating various features of the invention.

FIGURE 2 is a sectional elevational view showing the mechanical seal of FIGURE 1 in a slightly modified position.

FIGURE 3 is a partially broken away sectional view of the apparatus of FIGURE 1 taken generally along the line 3—3 of the figure.

FIGURES 4, 5 and 6 are cross sectional elevational views of certain modified forms of the invention.

FIGURE 7 is a fragmentary sectional elevational view of an apparatus illustrating a modified form of the invention.

FIGURE 8 is a fragmentary sectional view of the apparatus of FIGURE 7 taken generally along the line 8—8 of FIGURE 7.

Very generally this invention relates to a mechanical seal of the face type which includes an elastomeric resilient member which is impervious to liquid. This member, when placed in compression between a support or housing and an axially movable rigid sealing ring provides both an axial biasing force upon the sealing ring and a static seal to prevent secondary fluid leakage.

The resilient member is formed of a particular material and is shaped such that the forces imparted to the sealing member are comparable to the biasing characteristics achieved utilizing a coil spring arrangement.

Additionally, the material utilized possesses physical characteristics which allow effective operation in the compressed condition for a period of time exceeding the expected normal service life of the running face of the seal member without experiencing loss of resiliency or the establishment of permanent set in the resilient member.

Utilization of the arrangement shown provides a superior mechanical seal having a minimum number of separate elements.

Referring now to the drawings, and more particularly to FIGURES 1, 2 and 3 there is shown an apparatus illustrating an embodiment of the present invention.

In the illustrated embodiment, a mechanical seal assembly generally designated 11 is disposed in operative association with a housing 13 and a relatively rotatable shaft 15 supported by the housing upon a bearing 17. The shaft and housing form part of a fluid pump or other apparatus which contains a pressurized fluid. The seal 11 is adapted to provide an essentially fluid tight seal between the housing and the relatively rotatable shaft.

It must be appreciated that though the seal is considered to be essentially fluid tight, some leakage across the seal does, of necessity, occur. This is true of all face type mechanical seals and is essential to the prolonged service life of the seal structure.

The housing 13 defines the fluid chamber 19 and includes a recess or counterbore 21 open to the fluid chamber 19. The recess 21 is disposed in generally concentric relation to the shaft 17 and is adapted to support the mechanical seal assembly 11.

The shaft 15 is connected to an impeller 23 disposed within the chamber 19 and is adapted to effect pumping or pressurization of the fluid upon rotation of the shaft 15 by means (not shown). A radially directed annular surface 25 formed on the impeller 23 defines a running face for sealing engagement by the mechanical seal 11. The impeller running face is formed of metal or ceramic, and, therefore, the face 25 is a relatively hard surface. It must be understood that the seal face 25 need not be integral with the impeller 23 or shaft 15, it may be formed upon a separate element and connected to the shaft 15. The arrangement shown is considered as merely illustrative.

As seen in FIGURES 1 and 2 the mechanical seal 11 includes a rigid annular sealing ring 27, a resilient liquid impervious member 29 and a metallic shell 31.

The shell 31 is a thin walled element formed of brass or other like metal and serves to secure the seal assembly 11 to the housing 13. The shell is of annular configuration and is disposed in the recess 21 of the housing. It includes an inner tubular portion 33 and an outer tubular portion 35 which are concentric to the shaft 15 and which are connected by a radially directed wall 37.

Preferably, the outer tubular portion 35 has a diameter which is slightly larger than the diameter of the recess 21. By this arrangement placement of the shell within the recess causes compression of the outer tubular portion which results in retention of the shell in fixed relation to the housing.

The outer tubular portion is provided with a radially directed flange 39 which contacts the housing 13 to fix the axial position of the shell. Location of the shell could be accomplished by other means, such as contact of the outer surface of the radial wall 37 with the recess 21.

The inner tubular portion 33 has a diameter which is larger than the diameter of the shaft 15 to allow relative rotation of the shaft with respect to the shell 31. The inner tubular portion includes a free end provided with a plurality of axially extending protrusions 41 which are directed radially outwardly (best seen in FIGURE 3). In the embodiment illustrated, three such protrusions are provided. However, this number may be varied without departing from the scope of the invention.

Referring again to FIGURE 1 the rigid annular sealing ring 27 includes an annular seal surface defining ring 43 including a radially directed sealing face 45 disposed in sliding contact with the radially directed sealing face 25 formed on the impeller portion 23. The ring 27 is axially movable with respect to the shell and the relatively rotating surfaces 45 and 25 are maintained in sealing engagement by an axial biasing force imparted to the sealing ring 27 by the resilient member 29. These surfaces provide a dynamic seal between the housing 13 and the shaft 15.

The sealing ring 27 includes an inner cylindrical surface 47 having a diameter slightly larger than the diameter of the inner tubular portion 41. The ring 27 is disposed in overlying relation to the inner tubular portion and is slidable axially with respect to the shell.

The cylindrical surface 47 includes a plurality of radially outwardly directed notches 49 which mate with the protrusions 41 of the tubular portion. Therefore, though the ring 27 is axially movable with respect to the shell 11 it is fixed against rotation which may be caused by transfer of torque from the impeller surface 25 to the sealing face 45. The resilient member 29 is therefore relieved of torsional loading that would otherwise be transmitted to that member during operation.

The rigid annular sealing ring 27 further includes a radially directed load receiving surface 51 disposed in contact with the resilient member. A ring portion 53 defining an extension of the cylindrical surface 47 extends axially in a direction away from the surface 45.

The rigid annular sealing ring 27 may be made of any suitable material adapted to operate for extended periods to sliding contact with the surface 25 of the impeller 23. Suitable materials include plastic, carbon, or graphite impregnated compounds which provide a relatively low frictional coefficient to insure satisfactory seal operation over an extended service life.

In accordance with the present invention and as best seen in FIGURES 1 and 2 the resilient liquid impervious member 29 is interposed between the shell 31 and the rigid ring 27 and serves both as an axial biasing means and as a static seal to prevent secondary fluid leakage. The member 29 has an annular cross section defined by inner and outer cylindrical surfaces 55 and 57. The member additionally includes radially directed walls 59 and 61 in contact with the shell 31 and rigid ring 27 respectively.

An annular recess 63 including a radial surface 65 is provided at the radial wall 61 adjacent the inner cylindrical surface 55. This recess receives the ring portion 53 of the rigid sealing ring 27. The diameter of recess 63 may be slightly smaller than the diameter of the ring portion so that placement of the ring portion within the recess effects slight radial expansion of the portion of the resilient member surrounding the ring portion 53. The forces established in the resilient member served to retain the rigid ring in association with the resilient member prior to assembly of the seal into a pump apparatus (as in FIGURE 2). This arrangement, however, is not essential, and the diameter of the recess may be larger than the diameter of the ring portion 53.

A radially directed rim 67 is provided on the outer cylindrical surface 57 adjacent the radial wall 59. The diameter of this rim may be slightly larger than the diameter of the outer tubular portion 35 of the shell 31. Placement of the resilient member in the shell 31 compresses this rim slightly and the forces established retain the resilient member within the shell. In this way, a complete seal assembly is provided which may be easily handled prior to installation.

Again it should be understood that while the ring 67 provides a desirable feature its presence is not essential to the invention in its broadest sense.

Referring to FIGURE 2, the resilient member 29 in its free state (prior to installation) is disposed within the shell 31 with the radial wall 59 in contact with the wall 37 of the shell and the radial wall 61 in contact with the load receiving surface 51 of the rigid ring. The relative sizes of the diameter of the tubular portions of the shell 31 and the inner and outer cylindrical surfaces 55 and 57 of the resilient member are such that the resilient member is spaced from the tubular portions. This prevents contact of these surfaces after axial compression of the resilient member and precludes the establishment of frictional forces between these surfaces which might adversely affect operating characteristics of the resilient member 29.

After placement of the seal assembly 11 in the housing 13 the impeller 23 is positioned such that the seal surface 25 is spaced in relation to the recess 21 of the housing a particular distance which will effect compression of the resilient member 29 as shown in FIGURE 1. The relative position of the radially directed wall 37 of the shell 31 and the seal face 25 of the impeller 21 determines the degree of compression achieved and consequently determines the magnitude of the axial biasing force provided by the resilient member 29.

Compression of the resilient member 29 causes it to urge the rigid ring 27, which is axially movable, in a direction away from the shell 31 and into sliding engagement with the sealing surface 25. This provides the dynamic seal between the shaft 15 and the housing 13. Additionally, since the resilient member 29 is impervious to liquid, contact of the radial wall 59 with the wall 37 of the shell 31 and contact of the radial wall 61 with the load receiving surface 51 of the rigid ring 27 provide a static seal which prevents secondary leakage between the housing and the rigid sealing ring.

As shown in FIGURE 1 compression of the resilient member 29 causes it to assume a barrel shaped cross sectional configuration. The outer cylindrical surface 57 assumes a convex shape as viewed from the pressure chamber 19. This makes the resilient member less sensitive to the effects of fluid pressure which act upon that surface during the pumping operation. That is to say that the barrel shape of the resilient member is less sensitive to the fluid pressure acting radially inwardly upon the outer cylindrical surface 57 which tends to cause the member to buckle radially inwardly. In fact, the existence of the convex configuration causes translation of the fluid pressure forces into axial forces which complement the axial closing forces imparted to the rigid ring by virtue of the compression of the resilient member 29. As is well known increased fluid pressure can cause increased separating forces because of the increased penetration of pressurized fluid between the relatively rotating sealing faces. In some instances such as when a pressure surge or rapid pressure rise occurs, these separating forces overcome the closing forces of the biasing means and cause the seal to "pop open," which results in excessive leakage. Therefore, the convex configuration of liquid impervious member 29 and the resultant translation of fluid pressure forces into increased closing forces is important in that it provides effective compensation for the increased separating forces and prevents "popping open."

The inner cylindrical surface 55 of the resilient member 29 assumes a concave shape as viewed from the shaft 15. This reduces the possibility of engagement between this surface and the tubular portion 33 which could create frictional forces that would have an adverse effect upon the biasing characteristics of the resilient member.

It should be noted that though the inner tubular portion 33 presents a barrier between the resilient member and the relatively rotating shaft 15 its presence is not essential to the invention in its broadest scope. The barrel shape assumed by the resilient member in its compressed condition provides protection against inadvertent engagement between the shaft and the resilient member. The other function of the tubular member 33, namely, retention of the rigid sealing ring from rotation due to torque transfer could be achieved with equal effectiveness by other means. One such alternative method would include the use of protrusions similar to the protrusions 41 and notches such as the notches 49 associated with the outer tubular portion 35 and the outer diameter of the rigid sealing ring respectively.

The resilient member 29 is formed of a material that possesses particular physical properties important to the present invention. The material must be resilient in order to provide the necessary axial biasing force to the rigid sealing ring 27. It must additionally be impervious to liquid to provide the static seal between the housing (or shell 31) and the rigid sealing ring 27. Further, since the fluid being sealed is under pressure, i.e., from about 5 to 100 or more pounds/sq. in. it is desirable that the resilient member 29 not only be impervious to liquid but also that it retain this quality under these adverse operating conditions.

Additionally, seals of the face type are, under normal circumstances, expected to operate satisfactorily for extended periods of time. In automotive, commercial, and industrial applications such seals are expected to last for a period of years without the necessity of service or repair. Usually they are not expected to require servicing until nearly the entire seal surface defining ring 43 has worn away. Therefore, the spring rate of the material used must be such that the axial biasing force provided is effectively maintained even though substantial wear to the seal face 45 of seal surface defining ring 43 is experienced.

Additionally, it is of the utmost importance that the resilient member be formed of a material which can provide the necessary axial biasing force throughout the expected lifetime of the seal assembly. In other words it is essential that the material be able to withstand the continuous compressive loading which results from installation of the seal assembly into a pumping apparatus. The material must not be susceptible to relaxation because of compressive loading or the establishment of permanent compression set. If the material were not able to withstand these compressive forces and were to lose resilience, its ability to provide the necessary axial biasing force to maintain the surfaces 25 and 45 in sealing contact would be impaired and seal failure would result. It is important therefore that no such relaxation of the resilient nature of the member 29 be experienced over the expected lifetime of the seal assembly.

Seals of the face type are subjected to widely varying temperature conditions in certain applications. It is therefore desirable, though not essential, that the material of the resilient member be capable of effective operation under extreme temperature conditions, both high and low. For example, in automotive applications the temperatures experienced may be as low as −30° to −40° F. or as high as +250° to +275° F.

One material that has been found to possess the essential qualities described as well as other qualities which are desirable is silicone rubber. Silicone rubber is an elastomeric semi-inorganic polymer of such structure and molecular weight as to have many of the properties of rubber. It is impervious to liquid and is unaffected by water and water-glycol solutions.

Further, silicone rubber is capable of retention of its resilient nature for prolonged periods of time even though it is subjected to the continuous application of compressive forces. Certain forms of silicone rubber do not display any significant tendency to assume a permanent compression set, and may be retained in a compressed condition for extremely long periods of time without loss of ability to resume its original free length.

One particular type of silicone rubber which has been used to construct a seal in accordance with the principles of the present invention and which has been found to perform satisfactorily is a silicone rubber manufactured by the General Electric Company. This product is designated as RTV-340. RTV is a trade name for a family of room temperature vulcanizing silicone rubber compounds. Another silicone rubber which has been found to be satisfactory in the construction of a seal in accordance with the present invention is SE-517, also a product of General Electric Company. These silicone rubbers are organopolysiloxanes and derive their properties from a few percentages of methylphenyl siloxy and methylvinyl siloxy linkages. These materials are solid non-cellular elastomers and are particularly well adapted for use in practicing the invention in that they are not susceptible to compression set even after extended periods of time. Both materials were found to experience negligible compression set when subjected to a 20% compression and held at 240° F. for at least 1000 hours. The tests were performed on liquid impervious member shaped as shown in FIGURE 1 and having an axial length of one-half inch.

Additionally these materials operate satisfactorily over a range of from −40° F. to +300° F. They are, therefore, suitable for applications which encounter extremely adverse temperature conditions.

While the materials described above have been found to possess the physical characteristics necessary to make the material suitable for use in practicing the invention, it must be understood that the invention in its broadest sense contemplates the use of any material having the necessary resiliency, imperviousness and ability to resist compression set for prolonged periods. The particular materials described are included only for illustrative purposes and should not be considered as a limitation of the scope of the invention.

With respect to the characteristics of the materials which may be used for the member 29, other important factors which must be considered are the magnitude of the axial biasing force required to provide the dynamic seal and also the spring rate or "$k$" factor of the member. As has been stated, the seal face 45 wears during operation, and over the contemplated lifetime of the assembly the axial length of the seal surface defining ring 43 is reduced substantially. In many instances the entire ring may be worn away. Obviously this reduction in length allows axial elongation of the resilient member 29 and a corresponding reduction of the axial biasing force imparted to the ring 27. Therefore, the spring rate of the member 29 must be such that when the rigid ring is worn to its minimum length and replacement is imminent, the resilient member is still capable of providing an axial biasing force which is adequate. However, the spring rate must not be so high that the initial axial loads obtained are excessive. The latter would cause excessive wear of the seal face 25.

It is therefore desirable to utilize a material capable of providing a spring rate which closely parallels the spring rates obtained using a conventional coil-type compression spring common to previous face seal designs. Commonly, spring rates in the area of between 80 to 400 pounds/inch have been found to be suitable for most seal applications. To provide spring rates in this range a material suitable for use in constructing the resilient member 29 should have a Shore hardness in the range of from 15 to 50. If the material had a hardness below 15 it would not provide the necessary axial biasing force without excessive compression of the member. If it were above 50 the spring rate would be too great and even slight wear of the sealing faces would unload the member due to axial elongation.

The materials previously mentioned which have been found satisfactory for use in constructing the seal member have a Shore hardness within this important range. RTV-340 has a Shore hardness of from 20 to 25 and SE-517 has a Shore hardness of from 35 to 45. A sample of a resilient member constructed of RTV-340 having a shape as shown in FIGURE 1 and having an outer diameter of approximately 1.3 inches and an inner diameter of approximately 0.7 inch was found to have a spring rate of about 200 pounds/inch.

A sample of a resilient member similarly constructed of SE-517 was found to have a spring rate of about 350 pounds/inch. Both samples had an axial length of approximately 0.5 inch. The outer diameter of the test samples was 1.26 inches and the inner diameter was .740 inch.

FIGURES 4, 5 and 6 show three of many possible modifications which may be utilized in the construction of the resilient member 29. Each shape provides a slightly modified spring rate and the particular shape used in any application will be determined by the design requirements dictated by the configuration of the apparatus into which the seal assembly is to be installed. By varying the particular shape and material hardness a resilient member having the proper spring rate for a particular application may readily be provided.

FIGURE 4 shows a resilient member 29 having a generally rectangular cross section taken along a radius of the member. In this embodiment the rim 67 shown in the embodiments of FIGURES 1 to 3 has been removed. The spring rate of this member would be similar to that of the resilient member already described with respect to FIGURES 1 to 3.

FIGURE 5 shows a similar shape except that a radially directed groove 69 is provided on inner cylindrical surface 55. This arrangement would provide a resilient member having a lower spring rate than the member 29 of FIGURE 4.

FIGURE 6 shows a resilient member having an outer surface 71 which is generally frusto-conical. This configuration provides a slightly lower spring rate than the embodiment shown in FIGURE 4 and further provides a spring rate which is non-linear.

Another consideration which must be kept in mind in providing a resilient member 29 is that of the ratio of the axial length to the radial width of the cross section of the member taken along a radius. In FIGURE 4 the axial length or height referred to is designated "$h$" and the radial width is designated "$r$." This relationship must be such that when the resilient member is subjected to compressive loads the member is caused to assume the desirable barrel shape illustrated in FIGURE 1. If the ratio of axial length to radial width becomes excessively high the resilient member 29 will act as a column under compression and would buckle somewhere intermediate the radially directed walls 59 and 61. The member would be less able to withstand the effects of fluid pressure acting upon the outer surface 57. Conversely, if the ratio of height to width becomes too low, the resilient member 29 would act more as a washer when subjected to compressive loads and would not provide the necessary flexibility and spring rate desired for satisfactory operation.

In seal assemblies constructed in accordance with the present invention, height to width ratios in the range of from about 0.9 to 1 to about 5.0 to 1 have proven to be satisfactory. Resilient members constructed within these limits have been found to operate satisfactorily and have been capable of maintaining the proper sealing engagement between the sliding surfaces 25 and 45.

Turning now to the embodiment of FIGURES 7 and 8 there is shown a seal assembly generally designated 111 disposed in operative association with a housing 113 and a relatively rotatable shaft 115.

The housing 113 defines a fluid chamber 119 and includes a radially inwardly directed wall 120 terminating in spaced relation to the shaft 115. The housing further includes an axially extending wall 140 provided with a plurality of slots 141 best seen in FIGURE 8. The illustrated embodiment includes three such slots. An impeller 123 is secured to the shaft for rotation therewith and includes a radially directed seal face 125.

The seal assembly 111 includes a rigid annular seal ring 127 and a resilient liquid impervious member 129 similar to the resilient member 29 of the embodiment of FIGURES 1 to 3.

As best seen in FIGURE 7 the rigid annular sealing ring 127 includes an annular seal surface defining ring 143 having a radially directed seal face 145 disposed in sliding contact with the radially directed seal face 125 of the impeller 123. These surfaces are in sealing engagement and provide the dynamic seal between the shaft 115 and the housing 113.

The rigid annular sealing ring 127 is provided with a plurality of upstanding tabs 149 (best seen in FIGURE 8) which co-act with the slots 141 of the housing 113 to prevent rotation of the rigid sealing ring due to torque transmission between the sealing faces. Therefore, the resilient member 129 is not required to provide the necessary reaction force to prevent rotation of the rigid ring 127.

The rigid sealing ring 127 further includes a radially directed load receiving surface 151 and an axially extending ring portion 153 surrounding the shaft 115. This ring portion has an inner diameter which is larger than the shaft diameter to allow free relative rotation between these elements. As in the embodiment of FIGURES 1 to 3 the rigid sealing ring 127 may be made of plastic, carbon or any other suitable material possessing physical characteristics which make it suitable for continuous sliding engagement with the surface 125 of the impeller 123.

The resilient, liquid impervious member 129 of the illustrated embodiment is similar to the member 29 and the embodiment shown in FIGURES 1 to 3 possesses the essential qualities described with respect to that embodiment. The particular shape of the resilient member (which is shown merely for purposes of illustration) is similar to that shown in FIGURE 6. However, any appropriate shape may be used without constituting a deviation from the inventive concept shown and described.

The resilient member 129 is shown in its operative position, that is, in a compressed state between the wall 120 of the housing 113 and of the load receiving surface 151 of the rigid sealing ring 127. The rigid sealing surface 145 is therefore urged into sealing engagement with the surface 125 of the impeller 123 to provide a dynamic seal between the housing and the shaft. Additionally, as the resilient member is impervious to liquid, contact of the resilient member 129 with the housing wall 120 and the load receiving surface 151 provides the necessary static seal between these elements to prevent secondary leakage.

As shown in FIGURE 7 the resilient member in its compressed condition assumes a shape making it more capable to withstand the effects of fluid pressure acting on its outer surface. Additionally, this shape allows the inner surface of the resilient member to move away from the axially extending ring portion 153 preventing inadvertent frictional engagement between these members which would adversely affect the spring characteristics of the resilient member.

It should be noted that the axially extending ring portion 153 is not absolutely essential to the seal structure. The assumption of a barrel shape by the resilient member 129 when in its compressed condition is effective to prevent contact between the resilient member and the relatively rotating shaft. The presence of the ring portion 153 must therefore be considered as merely an added precaution in the event that extreme pressures are encountered which could force the resilient member in a direction toward the rotating shaft.

It is important to note that in the embodiment of the invention illustrated in FIGURES 7 and 8 only a minimal number of separate elements are necessary to provide a satisfactory face type mechanical seal arrangement. No shell such as the shell 31 of the embodiment of FIGURES 1 to 3 is required and, as is true of the previously described embodiment, the single element 129 (or the element 29 in the instance of the embodiment of FIGURES 1 to 3) takes the place of a coil spring, a liquid impervious boot, and load distribution ferrules commonly found in conventional seal structures.

From the above description it is apparent that an improved form of face type mechanical seal has been provided which includes a single element which provides the necessary axial biasing force essential to the dynamic seal between the housing and the shaft and additionally provides the necessary static seal to prevent secondary fluid leakage. Only a minimum number of separate elements are required. Additionally, the resilient member which simultaneously provides the axial biasing force and the static seal retains its resilient qualities over an extended period of time even though subjected to continuous compressive forces and is capable of satisfactory operation over a wide range of temperature conditions.

While various elements of the embodiments shown have been illustrated as being associated with a housing and others have been illustrated as being associated with a shaft it is obvious that these relationships could be reversed without in any way departing from the scope of the invention.

Various of the features of the invention have been particularly shown and described in connection with the illustrated embodiments of the invention. However, it must be understood that these particular arrangements merely illustrate and that the invention is to be given its fullest interpretation within the terms of the appended claims.

I claim:

1. A mechanical face seal for sealing a relatively rotating shaft in a housing to provide an essentially fluid tight seal against a pressurized fluid comprising: an axially movable, rigid, annular sealing ring surrounding the shaft including a radially directed sealing face urged into sliding engagement with a relatively rotatable coacting sealing face to provide a dynamic seal between the housing and the shaft, and a single, generally annular, liquid impervious member surrounding the shaft formed of a resilient non-cellular silicone material disposed intermediate the housing and said rigid annular sealing ring, said silicone member being axially compressed between said ring and the housing to act as a spring, thereby creating the entire axial biasing force urging said annular sealing ring into said sliding engagement with the relatively rotatable coacting sealing face, said single liquid impervious member further providing a fluid tight static seal between the housing and said rigid annular sealing ring.

2. A mechanical face seal as claimed in claim 1, wherein said resilient silicone member includes a generally cylindrical surface disposed to provide exposure to the pressurized fluid, compression of said member between said housing and said ring causing said surface to assume a generally convex barrel shape, and fluid pressure acting on said convex barrel shaped surface increasing the axial biasing force imparted by said member.

3. A mechanical face seal as claimed in claim 1 wherein said resilient member has a Shore hardness of between about 35 to about 45.

4. A mechanical face seal as claimed in claim 1 wherein said resilient member has a spring rate of about 200 pounds per inch.

5. A mechanical face seal as claimed in claim 1 wherein said resilient member retains its resilient property and resists the establishment of permanent compression set over the expected lifetime of said sealing face of said rigid annular sealing ring.

6. A mechanical face seal as claimed in claim 5 wherein said resilient member is made of a material which experiences negligible compression set when subjected to 20% compression at 240° F. for at least 1000 hours.

7. A mechanical face seal as claimed in claim 1 wherein said resilient member has an axial length to radial width ratio as measured along a radius of said member of between 3.0 to 1 to 5.0 to 1.

8. A mechanical face seal as claimed in claim 1 wherein said rigid annular sealing ring further includes a generally radially directed load receiving surface and an annular seal surface defining ring spaced therefrom extending axially outwardly of said rigid annular sealing ring, and further includes a ring portion extending axially in a direction away from said sealing face defining ring adjacent said load receiving surface, and wherein said resilient member is disposed in surrounding relation to said axially extending ring and further includes a generally radially directed surface in contact with said load receiving surface.

9. A mechanical seal as claimed in claim 8 wherein said resilient member includes an axially extending generally conical outer surface defining the outer perimeter of said member and a concentric generally cylindrical surface defining the inner perimeter said inner perimeter having a diameter larger than the diameter of said axially extending ring of said rigid annular sealing ring.

10. A mechanical face seal as claimed in claim 1 wherein said seal further includes an annular shell having an inner tubular portion, a concentric outer tubular portion and a connecting radially directed wall, said outer tubular portion connecting said seal to the support, and wherein said rigid annular sealing ring is disposed in overlying relation to said inner tubular portion and is axially movable wth respect thereto, said means preventing rotation of said rigid annular sealing ring including at least one radially directed protrusion formed on said inner tubular portion and at least one radially directed notch formed on said rigid annular sealing ring and overlying said protrusion and wherein said liquid impervious member is disposed intermediate said rigid annular sealing ring and said radial wall of said shell in generally radially directed fluid-tight contact with said wall and said shell.

11. A mechanical face seal as claimed in claim 10 wherein said resilient member includes an inner cylindrical surface having a diameter larger than the diameter of the inner tubular portion of said shell and an outer cylindrical surface having a diameter smaller than the diameter of said outer tubular portion of said shell.

12. A mechanical seal as claimed in claim 11 wherein said resilient member further includes a radially directed rim formed on said outer cylindrical surface having a diameter larger than the diameter of said outer tubular portion of said shell whereby placement of said liquid impervious members into said shell compresses said rim to retain said member within said shell.

13. A mechanical face seal as claimed in claim 12 wheren said resilient member includes a radially directed groove open at said inner cylindrical surface.

14. A mechanical face seal as claimed in claim 10 wherein said resilient member includes a generally axially directed conical shaped surface defining the outer perimeter thereof having a maximum diameter smaller than the diameter of said outer tubular portion of said shell and a generally cylindrical surface defining the inner perimeter of said member having a diameter larger than the diameter of said inner tubular portion of said shell.

References Cited

UNITED STATES PATENTS

| | | | |
|---|---|---|---|
| 2,341,900 | 2/1944 | Boden | 277—92 |
| 2,373,443 | 4/1945 | Armington | 277—92 |
| 2,395,095 | 2/1946 | Brady | 277—92 X |
| 2,598,886 | 6/1952 | Brummer | 277—42 |
| 3,160,417 | 12/1964 | Mueller | 277—42 X |
| 3,244,425 | 4/1966 | Wilkinson | 277—92 |
| 3,279,804 | 10/1966 | Blair | 277—92 |

OTHER REFERENCES

Silicone Materials, Product Engineering, April 1946, pp. 304–306.

LAVERNE D. GEIGER, *Primary Examiner.*

J. S. MEDNICK, *Assistant Examiner.*

U.S. Cl. X.R.

277—92, 237